United States Patent
Mitomi et al.

(10) Patent No.: US 6,950,580 B2
(45) Date of Patent: Sep. 27, 2005

(54) OPTICAL WAVEGUIDE DEVICES AND TRAVELLING WAVE TYPE OPTICAL MODULATORS

(75) Inventors: Osamu Mitomi, Nagoya (JP); Kenji Aoki, Ogaki (JP); Jungo Kondo, Aichi-prefecture (JP); Atsuo Kondo, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 77 days.

(21) Appl. No.: 10/628,472

(22) Filed: Jul. 29, 2003

(65) Prior Publication Data

US 2004/0120625 A1 Jun. 24, 2004

(30) Foreign Application Priority Data

Aug. 8, 2002 (JP) ........................................ 2002-231359

(51) Int. Cl.[7] ................................................ G02B 6/12
(52) U.S. Cl. .............................. 385/40; 385/2; 385/8; 385/131
(58) Field of Search ................... 385/40, 2, 8, 130–131

(56) References Cited

U.S. PATENT DOCUMENTS 5,991,491 A 11/1999 Madabhushi
6,219,469 B1 4/2001 Minakata et al.
2002/0159738 A1 10/2002 Aoki et al.
2003/0044100 A1 3/2003 Kondo et al.

FOREIGN PATENT DOCUMENTS

| EP | 1 176 455 A1 | 1/2002 |
| EP | 1 245 993 A2 | 10/2002 |
| EP | 1 291 706 A2 | 3/2003 |
| JP | A 62-172880 | 7/1987 |
| JP | A 5-93892 | 4/1993 |
| JP | 5-241115 A | 9/1993 |
| JP | 10-133159 A | 5/1998 |

*Primary Examiner*—Akm Enayet Ullah
*Assistant Examiner*—Jerry T Rahll
(74) *Attorney, Agent, or Firm*—Oliff & Berridge, PLC

(57) ABSTRACT

An optical waveguide device 1A has a substrate 22 and a supporting body 10 for supporting the substrate. The substrate 22 has a main body 2 made of an electrooptic material and one and the other main faces, optical waveguides 3a, 3b and electrodes 4B, 4C provided on the side of the one main face 2a of the main body 2 The supporting body 10 is joined with the substrate 2 on the side of the other main face, and the electrode has a feedthrough portion. The device 1A further has a low dielectric portion 7 provided under the feed through portion and between the other main face 2b of the main body 2 and the supporting body 10.

12 Claims, 15 Drawing Sheets

OPTICAL WAVEGUIDE DEVICES AND TRAVELLING WAVE TYPE OPTICAL MODULATORS

This application claims the benefit of Japanese Patent Application P2002-231, 359, filed on Aug. 8, 2002, the entirety of which is incorporated by reference.

BACKGROUND OF THE INVENTION

1. Field of the Invention

The present invention relates to an optical waveguide device and traveling wave type optical modulator.

2. Related Art Statement

A traveling-wave optical modulator using lithium niobate. (LiNbO$_3$), lithium tantalate (LiTaO$_3$) or gallium-arsenide (GaAs) for the optical waveguide has excellent properties and may realize a broadband modulation at a high efficiency. Lithium niobate and lithium tantalate are excellent ferroelectric materials having large electrooptic coefficients and can control light within a short optical path. Factors suppressing the modulation frequency of the traveling-wave optical modulator include velocity mismatch, dispersion, electrode conductor loss and dielectric loss.

The concept of velocity mismatch will now be further explained. In a traveling-wave optical modulator, the velocity of the light propagating through the optical waveguide largely differs from that of the signal microwave propagating through this electrode. Assume that the light and the modulation wave propagating through the crystal have different velocity Vo and Vm, respectively. For example calculation was made for an LiNbO$_3$ optical modulator having planar type electrodes. The effective refractive index of LiNbO$_3$ single crystal is 2.15, and the velocity of the light propagating through the optical waveguide is inversely proportional to the refractive index. On the other hand, the effective index for modulating wave is given by a square root of the dielectric constant near a conductor propagating the wave. LiNbO$_3$ is an uniaxial crystal, and the dielectric constant in the Z-axis direction is 28 and those in the X-axis and Y-axis directions are 43. Therefore, even if an influence of air having a dielectric constant of 1, the effective microwave index in the LiNbO$_2$ optical modulator having a conventional structure is about 4, which is about 1.9 times larger than 2.15. Thus, the velocity of the light wave is about 1.9 times as much as that of the modulating microwave.

The upper limit of bandwidth "fm" of the optical modulator or the modulating velocity is inversely proportional to a difference in velocity between the lightwave and the modulating microwave. That is, fm=1/(Vo·Vm). Therefore, assuming that the power loss by electrode is zero, the upper limit of bandwidth "fm"×electrode length "1"=9.2 GHz.cm. Actually, it has been reported that in an optical modulator having an electrode length "1"=2.5 mm, fm=40 GHz. The effect due to the upper limit of modulation speed becomes more substantial as the electrodes become longer. Therefore, an optical modulator having a broadband modulation and low driving voltage has been earnestly demanded.

The inventors have considered the following idea. That is, the velocity matching between signal microwave and lightwave may be realized by applying a thin plate with a thickness of, for example, 10 µm for an optical waveguide substrate.

The assignee filed a Japanese patent publication 10-133, 159A (6,219,469), and disclosed a travelling wave optical modulator for giving the solution. The modulator has an optical waveguide substrate having a thinner portion with a thickness of not more than 10 µm where the optical waveguide is formed. It is thereby possible to realize high-speed modulation without forming a buffer layer made of silicon dioxide, and to advantageously reduce the product "Vπ·L" of a driving voltage Vπ and a length of an electrode "L".

SUMMARY OF THE INVENTION

A feedthrough portion for supplying microwave to the electrodes in a high-speed optical modulator generally has an electrode gap wider than that in a modulating portion, for securing the electrical connection with a connector pin. It is thus necessary to widen a gap between ground and center (signal) electrodes for adjusting the characteristic impedance at 50Ω system. The wider electrode gap results in an increase of waveguide (structural) dispersion in the electrodes. Further, the electrode gap in the optical modulator becomes considerably different from electrode gap in the connector pin to be connected, so that the stray inductor and stray capacitor are increased. This increase may result in the deterioration of microwave properties of the electrodes.

An object of the present invention is to provide a novel structure of feedthrough portion of an electrode of an optical waveguide device, to realize impedance matching of the feedthrough portion and an outside connector pin, to reduce waveguide (structural) dispersion in the electrode, and to reduce stray inductor and stray capacitor in the electrode.

The present invention provides an optical waveguide device having a substrate and a supporting body for supporting the substrate. The substrate has a main body made of an electrooptic material and one and the other main faces, an optical waveguide formed in the main body and an electrode provided on the side of the one main face of the main body. The supporting body is joined with the substrate on the side of the other main face. The electrode has a feedthrough portion. The device further has a low dielectric portion provided under the feedthrough portion and between the other main face of the substrate and the supporting body.

According to the invention, the low dielectric portion is provided under the other main face of the main body at least under the feedthrough portion. It is thus possible to realize the impedance matching without the necessity of a considerably wider gap between electrodes. As a result, the waveguide (structural) dispersion of the electrode may be reduced. It is further possible to reduce a difference of the electrode gap in an optical modulator and that of a connector to be connected with the modulator, so that the stray inductor and capacitor may be reduced.

These and other objects, features and advantages of the invention will be appreciated upon reading of the following description of the invention when taken in conjunction with the attached drawings, with the understanding that some modifications, variations and changes of the same could be easily made by the skilled person in the art.

PREFERRED EMBODIMENTS OF THE INVENTION

The present invention will be described further in detail, referring to the attached drawings.

Figure 1:
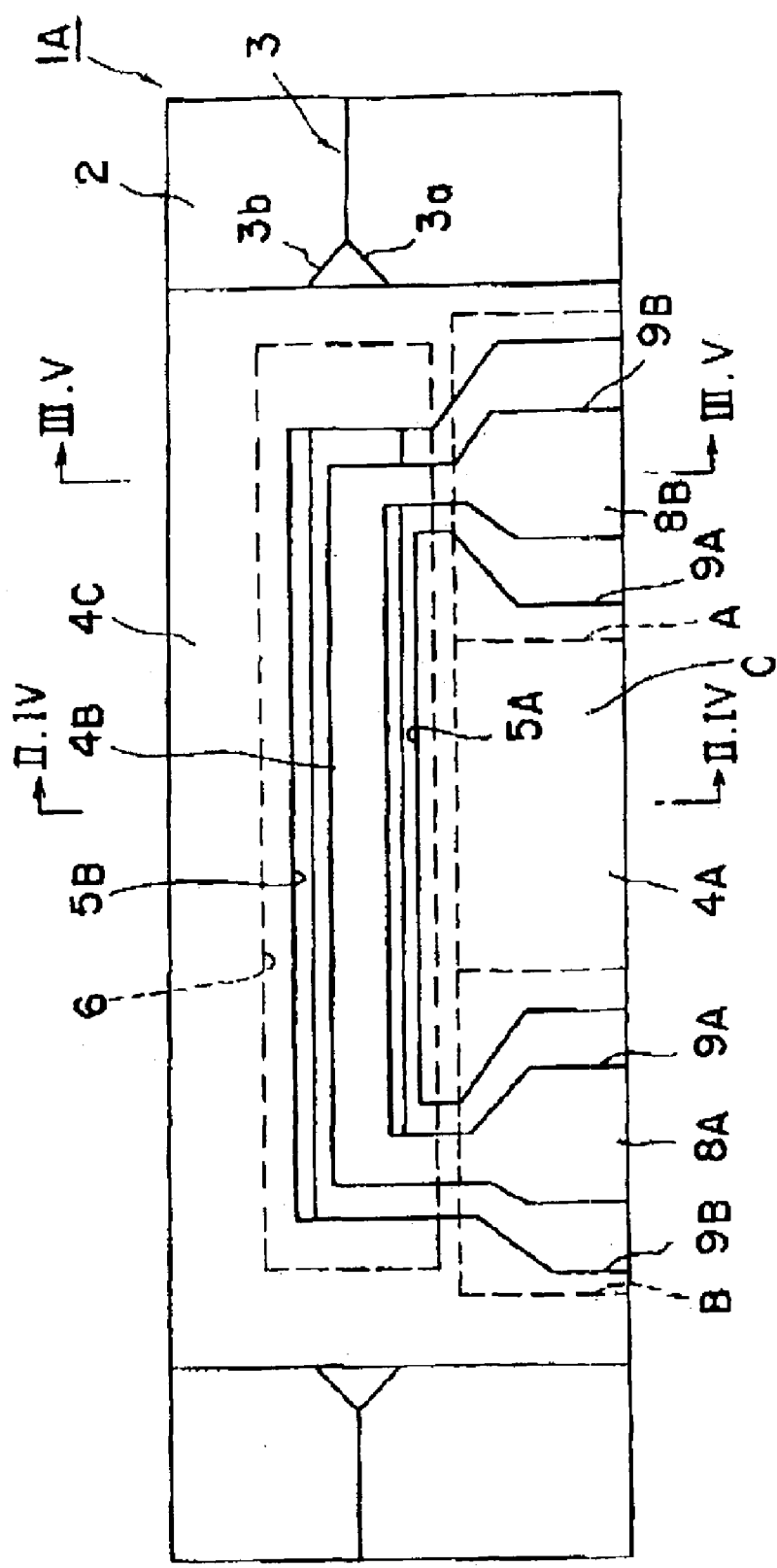
FIG. 1 is a plan view schematically showing an optical waveguide device 1A according to one embodiment of the present invention.
Figure 2:
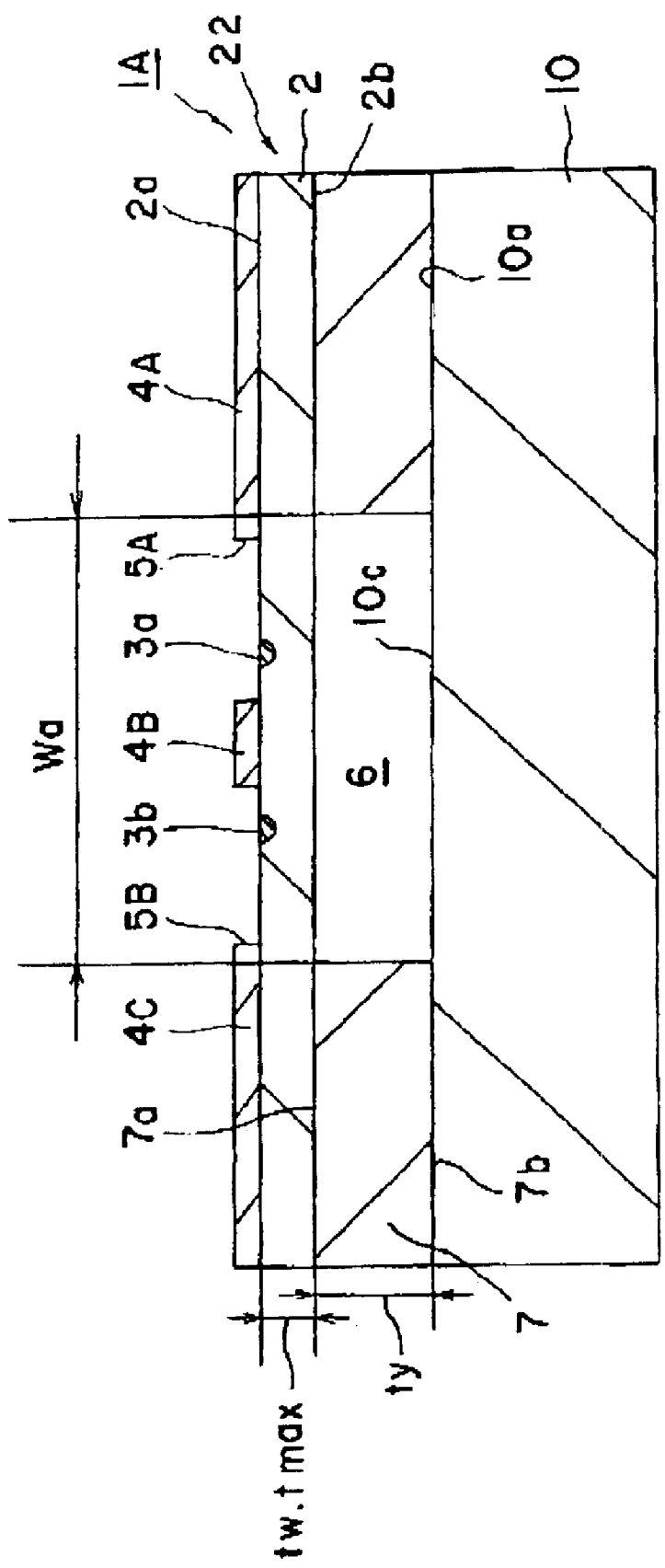
FIG. 2 is a cross sectional view cut along a II—II line of the device IA of FIG. 1.
Figure 3:
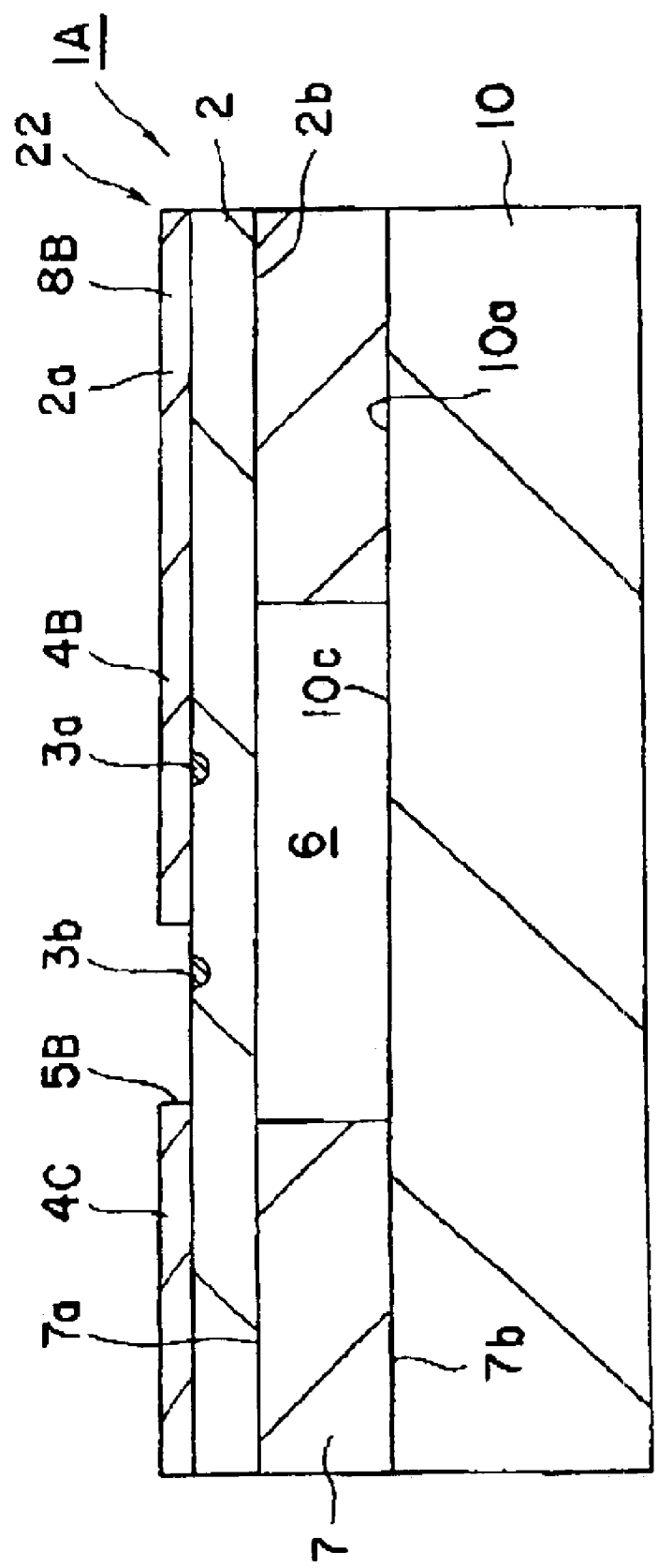
FIG. 3 is a cross sectional view cut along a III—III line of the device IA of FIG. 1.

FIG. 1 is a plan view schematically showing an optical waveguide device 1A according to one embodiment of the present invention. FIG. 2 is a cross sectional view cut along a II—II line in FIG. 1, and FIG. 3 is a cross sectional view cut along a III—III line in FIG. 1.

The optical modulator 1A has an optical waveguide substrate 22 and a supporting body 10. The main and supporting bodies 2 and 10 are plate-shaped. Predetermined electrodes 4A, 4B and 4C are formed on a main face 2a of the main body 2. 4A and 4C represent ground electrodes, and 4B represents a center electrode in the present example. Although it is applied a so called coplanar waveguide type electrode (CPW electrode) configuration in this example, the configuration of electrodes are not particularly limited. The present invention may be applied to an electrode configuration of asymmetric coplanar strip line: A-CPS type). The present invention may be applied to a traveling wave type optical modulator of so called independent modulation system.

In the present example, branched parts 3a and 3b of an optical waveguide are formed between the ground electrode 4A and center signal electrode 4B and between the center electrode 413 and ground electrode 4C, respectively. A signal voltage may be applied onto each of the branched parts 3a and 3b in a direction substantially parallel with the main face. The optical waveguide 3 is of Mach-Zehnder type structure.

The other main face 2b of the main body 2 and the surface 10a of the supporting body 10 are joined with each other through a joining layer 7. In the present example, the joining layer 7 has a some degree of thickness, so that a space 6 is formed inside of the joining layer 7.

A pair of feedthrough portions A and B is provided in the electrodes of the optical waveguide substrate 22. In each of the feedthrough portions A and B, the ground and center electrodes are connected with outer connector pins, respectively. The characteristic impedance of each connector pin is adjusted at a specific value, for example 50Ω. It is thus necessary to standardize the characteristic impedance of the electrode at a specific value in each feedthrough portion. For the standardization, it is necessary to increase the widths of the connecting parts 8A and 8B of the center electrode 4B and the gaps 9A and 9B between the ground and center electrodes 9A and 9B. As a result, the waveguide (structural) dispersion of the electrode, and a difference between the electrode gaps of the center and ground electrodes and that in the connector pin are increased.

According to the invention, at least in the region of each of the feedthrough portions A and B, it is needed to provide a low dielectric portion between the other main face 2b of the main body 2 and supporting body 10. According to the example, the whole of the joining layer 7 is formed with a material having a low dielectric constant. A low dielectric portion is thus provided between the other main face 2b of the main body 2 and supporting body 10, in each of the regions of the feedthrough portions A and B.

According to the structure, even if the electrode gaps are the same, it is possible to increase the characteristic impedance of the microwave electrode in each of the feedthrough portions A, B, so that the impedance matching may be facilitated. It is thus possible to realize the impedance matching without the need of a wider electrode gap. The waveguide (structural) dispersion of the electrode may be thus prevented. Further, it is possible to reduce the electrode gap in the optical modulator and that in the connector pin to be connected, so that the stray inductor and capacitor may be reduced.

The main body for the optical waveguide substrate is made of an electrooptic material having ferroelectricity and may preferably be made of a single crystal. Such crystal is not particularly limited as far as it is effective for light modulation, and includes lithium niobate, lithium tantalate, lithium niobate-lithium tantalate solid solution, potassium lithium niobate, KTP, GaAs and quartz. Lithium niobate, lithium tantalate and lithium niobate-lithium tantalate solid solution single crystals are particularly preferred.

The electrode may be made of a material not particularly limited so long as it has a low resistance and excellent impedance property, including gold, silver, copper or the like.

The supporting body may preferably be made of a material having a dielectric constant lower than that of the electrooptic material for minimizing the adverse effects of the supporting body on the velocity of propagation of microwave. Such material includes a glass such as quart glass.

A difference between the linear thermal expansion coefficient of the main body and that of the supporting body may be reduced at a value not larger than ±50 percent for preventing the influence of the change of ambient temperature on the light modulation. In this case, the materials for the main and supporting bodies may be the same or different with each other.

The material for the supporting body may preferably be a material having a dielectric constant not lower than that of the electrooptic material constituting the main body of the waveguide substrate. In this case, the supporting body may preferably be made of the substantially same kind of single crystal as that constituting the main body.

This embodiment includes the case that the main formulation (for example, main formulation constituting not less than 80 mole percent of the whole), particularly for a single crystal, is common with the supporting and main bodies. An ingredient or ingredients other than the main formulation may be the same or the different with each other.

A buffer layer may be provided between the surface (main face) of the main body and electrode. The buffer layer may be made of any known materials such as silicon dioxide, magnesium fluoride, silicon nitride and alumina.

In a preferred embodiment, the optical waveguide is formed in or on the side of the main face of the main body. The optical waveguide may be a ridge type optical waveguide directly formed on the main face of the main body, or a ridge type optical waveguide formed on another layer on the main face of the main body. Alternatively, the optical waveguide may be an optical waveguide formed by inner diffusion process such as titanium diffusion process, or an optical waveguide produced by ion exchange process such as proton exchange. The electrode may be on the side of the main face of the main body as described above. The electrode may be directly formed on the main face of the main body, or may be formed on the buffer layer on the main face.

In the main body, the polarization axis of the crystal is substantially parallel with the one main face (surface) of the substrate. In this case, the main body may preferably be composed of an X-plate or Y-plate made of single crystal of lithium niobate, lithium tantalate or lithium niobate-lithium tantalate solid solution. The present invention is applied to such X or Y-plate in the example described referring to FIGS. 1 to 3.

Further in another preferred embodiment, the polarization axis of the crystal is substantially perpendicular to the one main face (surface) of the substrate. In this case, the main body may preferably be composed of a Z-plate made of single crystal of lithium niobate, lithium tantalate or lithium niobate-lithium tantalate solid solution. When such Z-plate is used, it is necessary to provide an optical waveguide direct under the electrodes. It is thus preferred to provide the buffer layer between the surface of the main body and electrode for reducing the propagation loss of light.

According to the present invention, the low dielectric portion provided at least under the feedthrough portion means a portion having a dielectric constant lower than that of the electrooptic material constituting the main body. (dielectric constant of low dielectric portion)/(dielectric constant of electrooptic material constituting main body) may preferably be not higher than $1/3$ and more preferably be not higher than $1/10$.

The low dielectric portion may be a space. Further the low dielectric portion may be made of a solid material having a dielectric constant lower than that of the electrooptic material constituting the main body.

In a preferred embodiment, a region of the other main face of the main body under the optical waveguide faces a space or a material of a low dielectric constant. It is thus possible to realize the velocity matching at high speed modulation. For example in FIGS. 1 to 3, a region of the main face 2b of the main body 2 under each of the optical waveguides 3a and 3b faces a space 6. A material of a low dielectric constant may be filled in a part or the whole of the space 6. The material of a low dielectric constant means a material having a dielectric constant lower than that of the electrooptic material for the main body 2. (dielectric constant of low dielectric material)/(dielectric constant of material for main body) may preferably be not higher than $1/3$ and more preferably be not higher than $1/10$.

According to the present invention, the low dielectric portion is provided between the main body 2 and supporting body 10, at least under each of the feedthrough portions A and B.

A low dielectric portion may be or may not be provided in a region other than the feedthrough portions A and B under the main body 2. A low dielectric portion may be provided under the main body 2 in a region other than the feedthrough portions A and B, for example in a region C (FIG. 1) between the two feedthrough portions A and B. Alternatively, a low dielectric portion may be provided under the main body 2 in a region other than the feedthrough portions A and B and the region C. However, other than the regions A and B, a material having a dielectric constant not lower than that of the low dielectric material constituting the main body may be provided between the main and supporting bodies. Such material includes alumina, aluminum nitride, lithium niobate, lithium tantalate, gallium arsenide and silicon oxide.

Further, the whole of the supporting body may be made of a low dielectric material. In this case, the supporting body may function as the low dielectric portion under the feedthrough portion.

In a preferred embodiment, it is provided a joining layer joining the supporting body and the other main face of the main body, and a space is formed inside of the joining layer. Alternatively, a low dielectric material is, filled in a part or the whole of the space. For example in the example of FIG. 1, the space 6 is formed inside of the joining layer 7. The advantageous effects are described below.

The inventors have studied the whole process for manufacturing a travelling wave optical modulator. They have tried to form a recess on the surface of an optical waveguide substrate by machining, as described in the Japanese Patent publication 10-133, 159A, to form a thinner portion with a thickness of for example not more than 10 $\mu$m. They finally found the following problems. FIG. 3 schematically shows such substrate 16. A deep recess 17 is formed by, for example laser beam working or grinding, from the back face 16b of the substrate 16. The substrate 16 has a thickness of for example 0.3 mm and the thinner portion 16c has a thickness of for example 10 $\mu$m. A thicker portion 16a is left after the working in the substrate 16 to preserve the mechanical strength. 16d is a worked surface.

Figure 13:
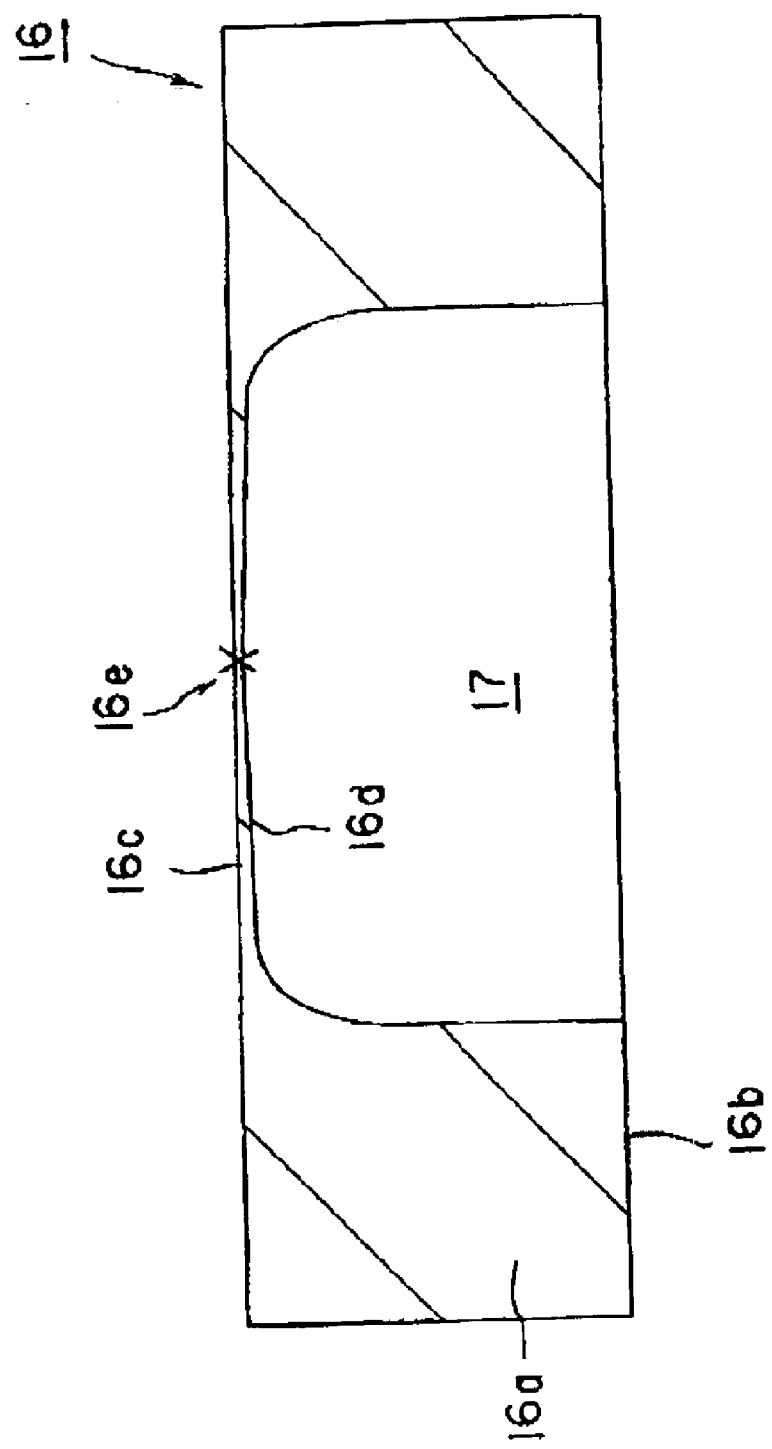
FIG. 13 is a cross sectional view schematically showing the shape of an optical waveguide device 16 of a prior art.

In an actual working process, however, it may be difficult to form the recess with an ideal shape shown in FIG. 13. For example, the recess is formed by laser beam working using a lens, as the recess 17 is deeper, the focus of the lens moves so that the worked surface 16d is curved or rounded. It is therefore difficult to maintain the thickness of the thinner portion 16c at a specific value. The thickness of the central part of the thinner portion 16c tends to be considerably smaller than that of the peripheral parts of the thinner portion. As a result, when the working is performed so that the thickness of the thinner portion 16c is maintained not larger than a specified value, for example not larger than 10 µm, over a sufficiently wide area, the thickness of the central part of the thinner portion 16c becomes considerably smaller than 10 µm. In other words, if the thickness of the peripheral part of the thinner portion 16c is adjusted to 10 µm, the central part of the thinner portion 16c is made considerably smaller than 10 µm. Such thin central part with a thickness of smaller than 10 µm may easily be broken as 16e. When the substrate 16 is worked using a grinding stone, the above problems cannot be avoided.

On the contrary, according to the above embodiment, a sufficient strength of a device may be assured by providing a separate supporting body. That is, the supporting body is joined with the optical waveguide substrate to provide a mechanical strength sufficient for handling the device. As a result, it is not necessary to provide a thicker portion in the optical waveguide substrate for assuring the mechanical strength sufficient for handling, so that the total thickness of the optical waveguide substrate may be considerably reduced. At the same time, the space or low dielectric portion is provided inside of the joining layer, so that the velocity of propagation of microwave propagating in the electrode may be improved. A sufficient strength for handling may be given for the whole device to prevent the warping of the optical waveguide substrate. Further, it is possible to reduce off specification products due to cracks or fracture caused during the working process for forming the thinner portion in the optical wave guide substrate. It is thereby possible to reduce the thickness of the optical waveguide substrate and to improve the propagating velocity of signal wave applied onto the electrode.

For example, according to the device 1A shown in FIGS. 1 to 3, the strength of the whole device may be preserved by means of the supporting body 10 with a relatively large thickness, providing a strength sufficient for handling to the device. The warping of the main body 2 may also be prevented. The thickness of the main body 2 may be also reduced, and the thickness of the joining layer 7 may be relatively large, thus improving the propagation velocity of microwave in the electrode. In other words, as the thickness "tw" of the main body 2 is smaller (thinner), the propagation velocity of the microwave may be higher. Further, as the depth (11) of the space 6 is larger (deeper), the propagation velocity of the microwave may be higher.

It is further noted that the shape of the exposed face 6c of the supporting body 10 to the space 6 has little influence or effects on the light propagating through the optical waveguide and the microwave signal propagating through the electrode. In other words, the exposed face 10a is too distant from the optical waveguide 3a, 3b or electrodes 4A, 4B and 4C to put a substantial influence upon them. The light modulation may be scarcely affected, even when the exposed face 10a has a curved shape or the thickness of the supporting body 10 is uneven.

On the other hand; as shown in FIG. 13, a recess is formed on the side of the back face of the optical waveguide substrate. In this device, when the recess has an curved inner wall face or the thickness of the thinner portion is uneven, the light propagating through the optical waveguide or micro wave signal propagating through the electrode may be substantially affected.

In a preferred embodiment, the low dielectric portion under the feedthrough portion functions as a joining layer joining the supporting body and the other main face of the main body.

Further in a preferred embodiment, the low dielectric portion under the feedthrough portion is composed of a resin sheet between the supporting and main bodies.

The material of the joining layer is not particularly limited. The material includes a thermal setting type adhesive, an ultraviolet curable adhesive, and a adhesive having a thermal expansion coefficient near that of an electrooptic material such as lithium niobate, for example "ALON CERAMICS C" (manufactured by Toa Gosei Co., Ltd. and having a thermal expansion coefficient of $13 \times 10^{-6}$/K)

The resin sheet is not particularly limited and may preferably be a film made of a resin having a thickness of not larger than 300 µm, including "T-2000" (supplied by Hitachi Chemical Co. Ltd.), "CARBODILITE FILM" (supplied by Nisshinbo Industries Inc.) and "A-1400", "A-1500" and "A-1600" (supplied by Nagase Chemtech).

The thickness of the joining layer and that of the resin sheet may preferably be not smaller than 5 µm for increasing the depth of the space or thickness of the low dielectric material under the optical waveguide to improve the modulation speed.

Further, the dielectric material suitable for use in the low dielectric layer may be a material having a low dielectric loss (low tan δ) for reducing the propagation loss of microwave modulation signal. Such material having a low dielectric constant and low dielectric loss includes "Teflon" and an acrylic resin adhesive.

Another low dielectric material includes a glass adhesive, an epoxy resin adhesive, a layer insulator for producing a semiconductor, and polyimide resin.

Figure 4:
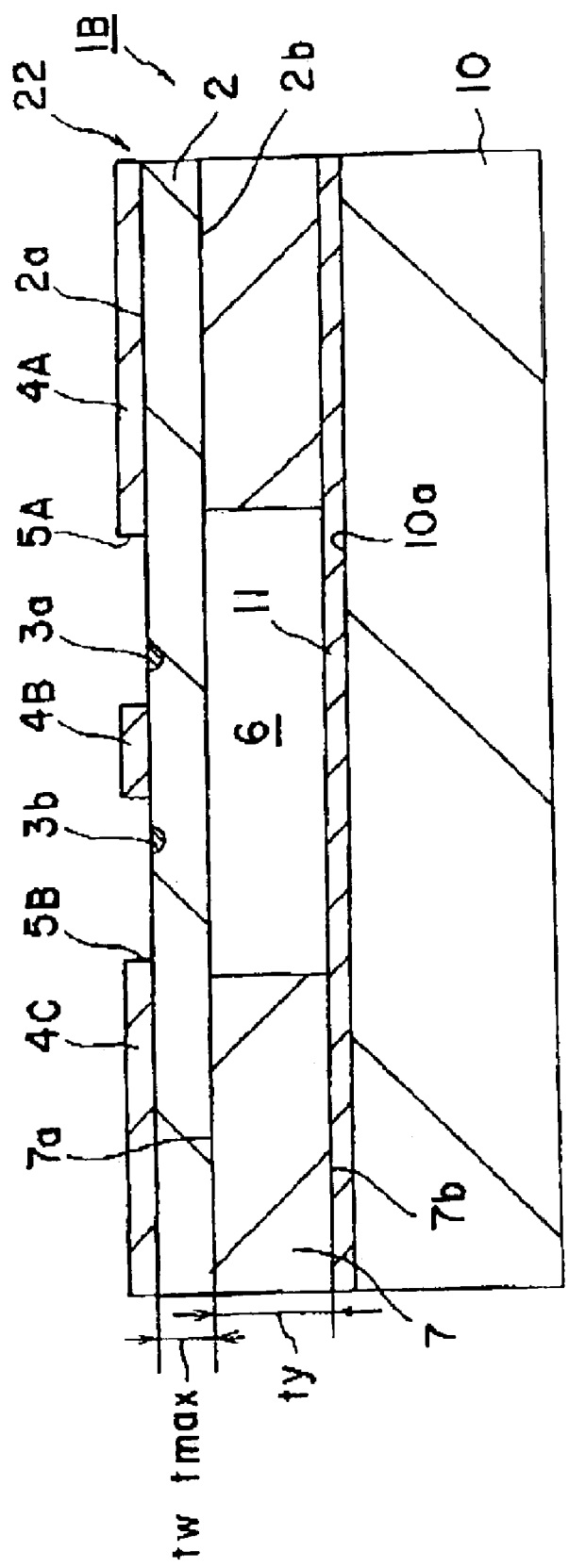
FIG. 4 is a cross sectional view showing a device 1B according to another embodiment, corresponding with a cross section cut along a IV—IV line of FIG. 1, where a conductive layer 23 is formed on the surface 10a of a supporting body 10.
Figure 5:
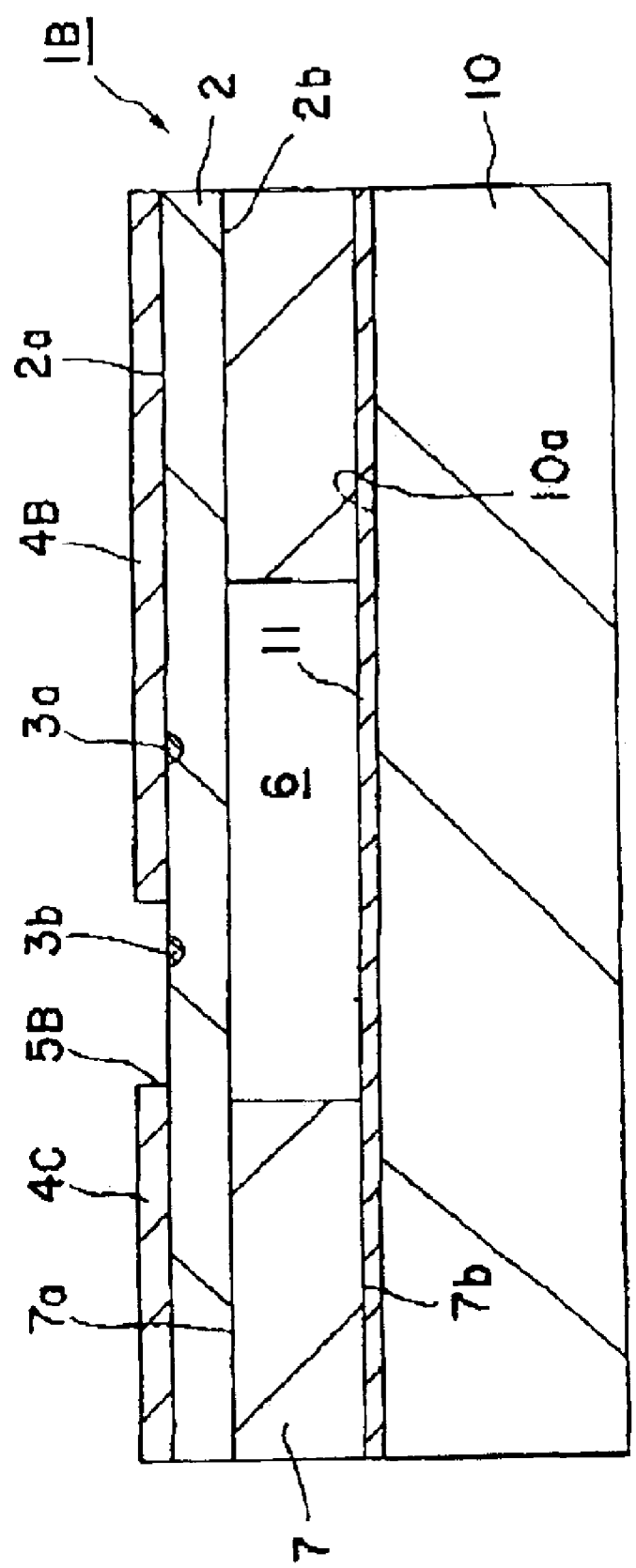
FIG. 5 is a cross sectional view showing a device 1B according to another embodiment, corresponding with a V—V line of FIG. 1.

In a preferred embodiment, a conductive layer is provided on the surface of the supporting body at least under the feedthrough portion. FIGS. 4 and 5 show a device 1B according to this embodiment. FIG. 4 corresponds with a cross section cut along a IV—IV line in FIG. 1 and FIG. 5 corresponds with a cross section cut along a V—V line in FIG. 1. In the present example, a conductive layer 23 is formed to cover the surface 10a of the supporting body 10.

In the present example, the conductive layer 23 is provided to cover the surface of the supporting body 10. It is thus possible to shift the frequency of cavity resonance mode from the modulation frequency of the optical modulator. However, particularly in the feedthrough portion, the characteristic impedance may be extremely low due to the conductive layer 23. According to the present invention, however, the low dielectric layer 7 is inserted and the conductive layer 23 is provided between the low dielectric layer 7 and supporting body 10. It is thus possible to preserve a relatively high characteristic impedance even in the feedthrough portion. It is further possible to prevent the cavity resonance mode.

The conductive layer 23 is made of a material such as gold, copper, silver, platinum, amorphous silicon, aluminum, or titanium.

The material of the conductive layer 23 may be 1 nm or more for preventing the cavity resonance.

In the following example, the main body and supporting body are joined with a joining layer, and a space and/or low dielectric material is provided inside of the joining layer. FIGS. 6, 7, 8 and 9 are cross sectional views schematically showing optical waveguide devices 1C, 1D, 1E and 1F, respectively. In FIGS. 6 to 9, parts already shown in FIGS. 1 to 3 are specified using the same numerals and the description may be omitted.

Figure 6:
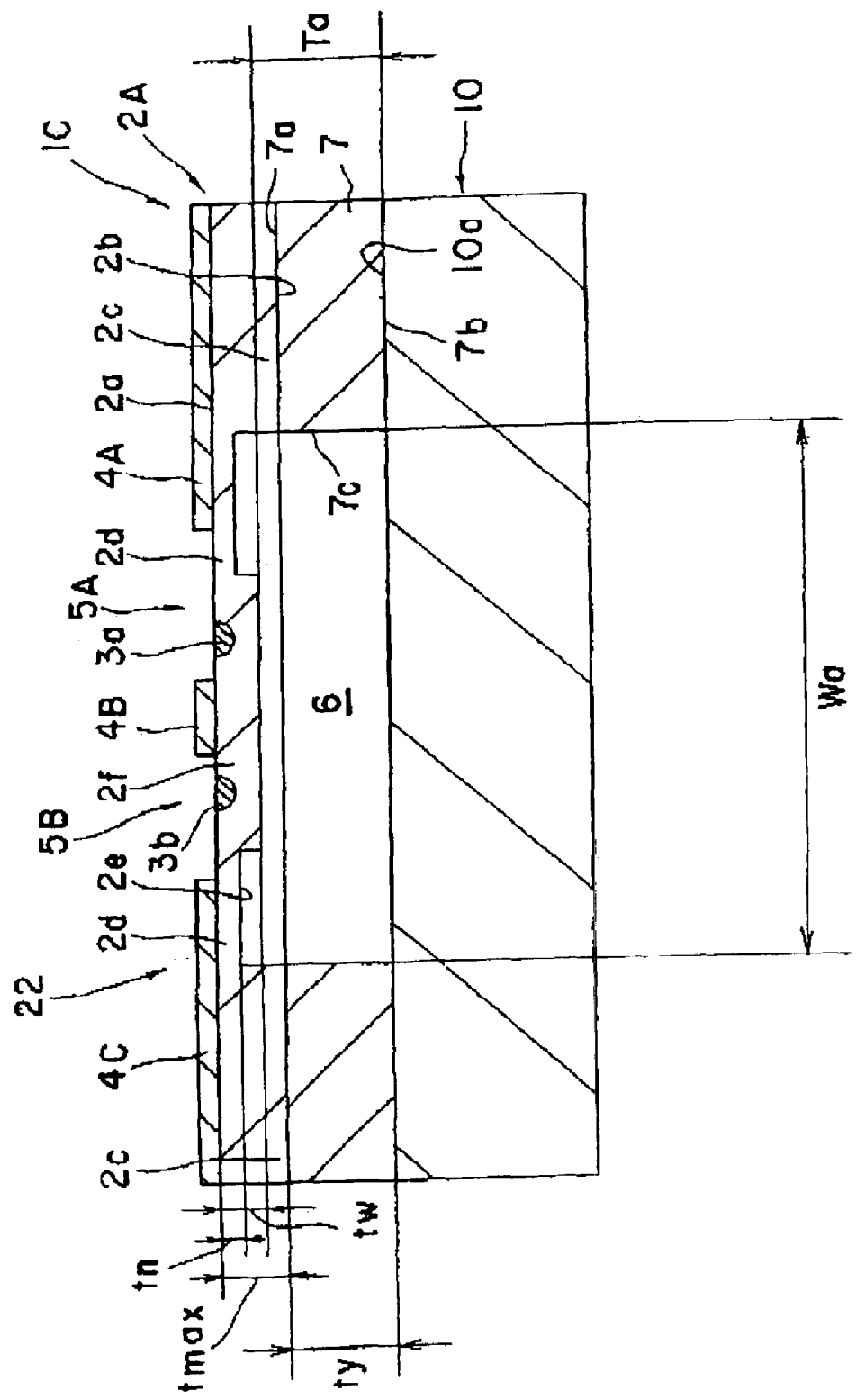
FIG. 6 is a cross sectional view schematically showing a device 1C according to still another embodiment, in which a space 6 is formed inside of a joining layer 7.

In an optical waveguide substrate 22 of the device 1C shown in FIG. 6, a recess 2e is formed on the side of the other main face 2b of the main body 2A. Two first thinner portions 2d and one first thinner portion 2f face the recess 2e. The portion 2f is provided between a pair of the thinner portions 2d. A base 2c having a thickness larger than the portion 2f is provided outside of each thinner portion 2d.

According to the present example, the supporting body 10 is substantially plate-shaped, and a space or low dielectric portion is not provided in the supporting body 10. The supporting body 10 has a flat surface 10a, which is joined with the joining face 2b of the main body 2A with the joining layer 7 having a thickness of "ty". 7a and 7b represent the joining faces of the joining layer 7. As a result, a space 6 is formed by the other main face 2b of the main body 2A and the flat surface 10a and the joining layer 7. The inner face 7c of the joining layer 7 faces the space 6.

High speed modulation as described above may be realized, by providing the space 6 inside of the joining layer 7, or by filling the low dielectric material in a part or the whole of the space 6.

Figure 7:
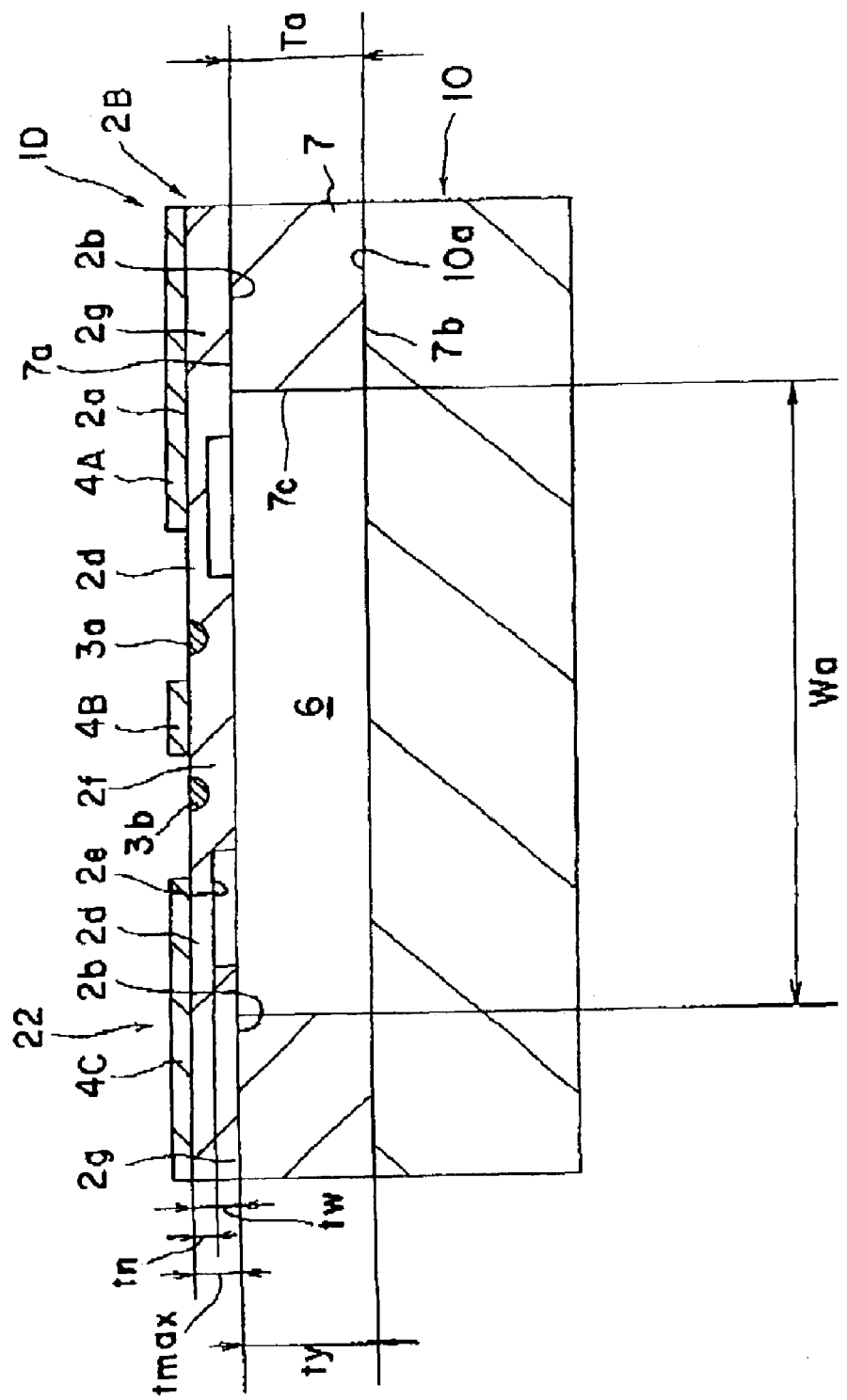
FIG. 7 is a cross sectional view schematically showing a device 1D according to still another embodiment, in which a space 6 is formed inside of a joining layer 7.

In the modulator 1D shown in FIG. 7, two second thinner portions 2d and one first thinner portion 2f face the recess 2e. The portion 2f is provided between a pair of the thinner portions 2d. A base 2g having substantially the same thickness as that of the portion 2f is provided outside of each thinner portion.

Figure 8:
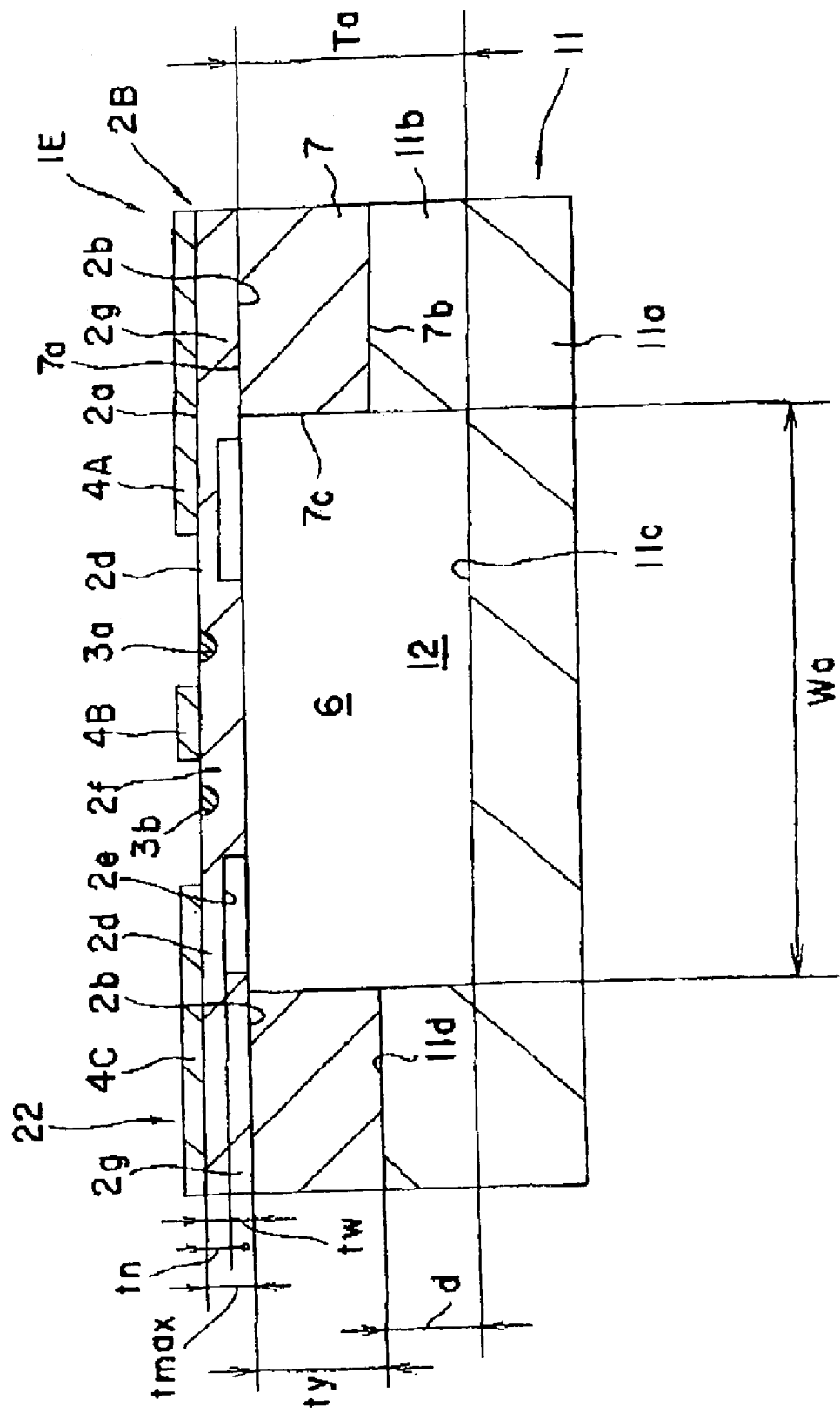
FIG. 8 is a cross sectional view schematically showing a device 1E according to still another embodiment, in which a space 6 is formed inside of a joining layer 7 and a recess 11c is formed in a supporting body 11.

In a preferred embodiment, the low dielectric portion may be inside of the joining layer as well as in the supporting body. FIG. 8 relates to this embodiment.

An optical waveguide device 1E shown in FIG. 8 is substantially same as that shown in FIG. 7. In the example, a recess lie is formed in the supporting body 11. The supporting body 11 has a plate-shaped portion 11a and side wall portion 11b protruding from the portion 11a. The recess 11c is formed inside of the side wall portion 11b. One main face lid of the supporting body 11 is joined with the joining face 7b of the joining layer 7. The joining face 7a of the joining layer 7 is joined with the back face 2b of the main body 2B.

In the present example, a space 12 formed in the supporting body 11, the space 6 formed inside of the joining layer 7 and the recess 2e formed in the side of the other main face 2b of the main body 2B are communicated together to form a larger space.

Figure 9:
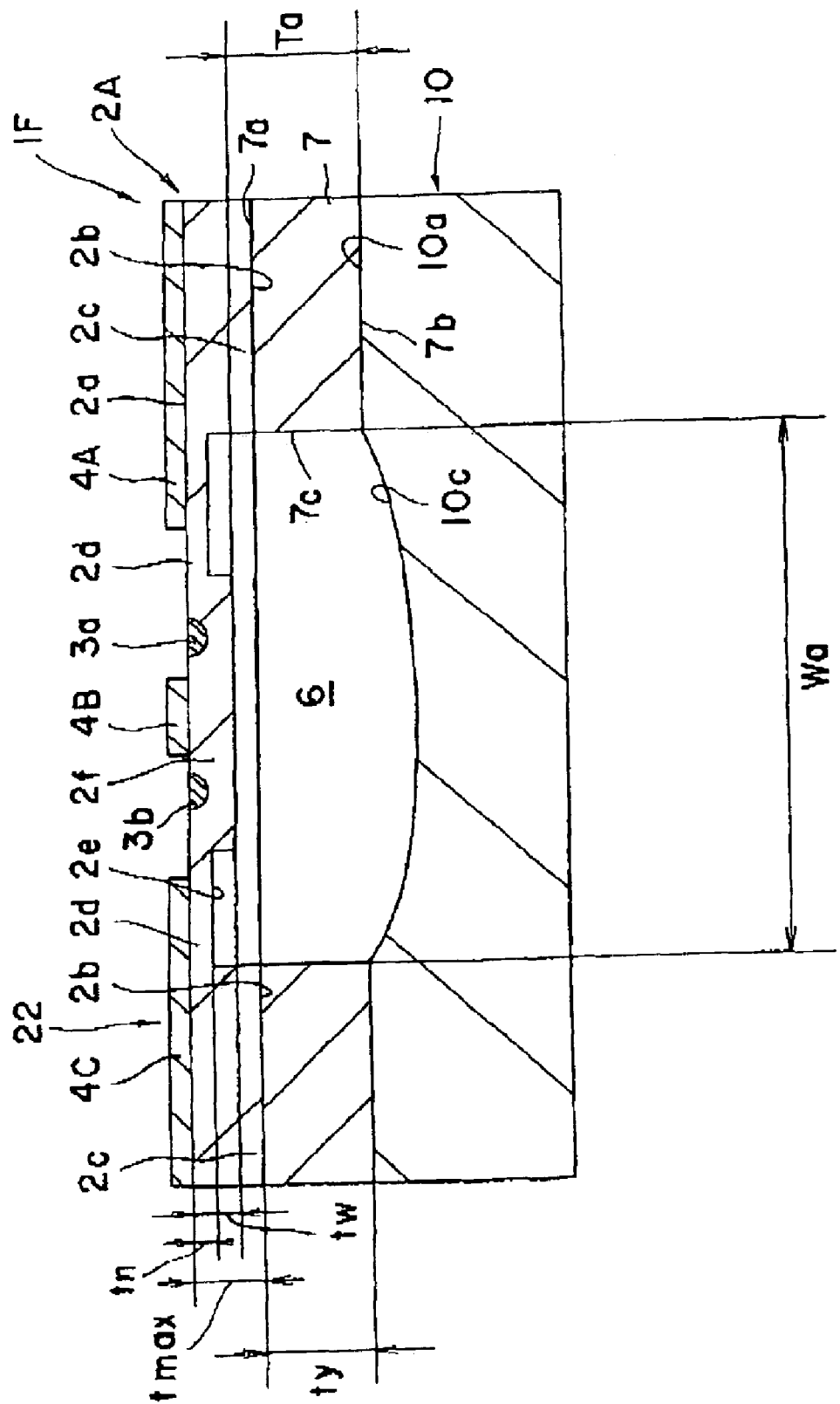
FIG. 9 is a cross sectional view schematically showing a device IF according to still another embodiment, in which a space 6 is formed inside of a joining layer 7 and a recess 11c is formed on the surface of a supporting body 11.

In a device 1F shown in FIG. 9, a recess 10c is formed on the surface 10a of the supporting body 10. The recess may preferably be a curved face.

The total thickness "Ta" of the low dielectric portion or portions, at the region where the optical waveguide is provided, may preferably be not smaller than 5 μm and more preferably be not smaller than 30 μm for facilitating the velocity matching of the Light wave and microwave.

The thickness "d" of the low dielectric portion formed in the supporting body and the thickness "ty" of the joining layer may be decided depending on the designed value of "Ta". However, "ty" may preferably be not smaller than 5 μm for improving the contribution of the low dielectric portion inside of the joining layer on the microwave modulation.

The width "Wa" of the low dielectric portion may preferably be not smaller than 5 μm and more preferably be not smaller than 100 μm for facilitating the velocity matching of the light wave and microwave.

Further in a preferred embodiment, the main body has a first thinner portion and a second thinner portion both facing the recess, in which the first thinner portion has a thickness larger than that of the second thinner portion. The optical waveguide is provided within the first thinner portion (see FIGS. 6, 7, 8 and 9).

For example, for attaining the velocity matching in a travelling-wave optical modulator operating at an electric signal with a frequency not lower than 10 GHz, it is generally necessary to reduce the thickness of the thinner portion of the main body to about 10 μm. However, the thinner portion is normally exposed to air whose refractive index is substantially lower than that of the electrooptic material. Consequently, as the thickness of the thinner portion approaches about 10 μm, the cross section of the light beam propagating through the optical wave guide tends to be elliptic. On the other hand, the cross section of the light beam propagating through outside optical fibers is substantially complete round and the optical fibers are optically connected with the optical waveguide. This creates a substantial mismatch between the distribution of light intensity of beam propagating through the optical fiber and that of beam propagating through the optical waveguide in the travelling-wave optical modulator. The optical energy of the incident light is not effectively transmitted to induce a coupling low.

Contrary to this, the main body 2 has the first thinner portion 2f and the second thinner portion 2d with a thickness smaller than that of the first portion, both facing the recess 2e. The optical waveguide is provided in the first thinner portion 2f so that the above coupling loss may be further reduced.

The thickness "tw" of the first thinner portion 2f may preferably be not larger than 100 μm and more preferably be not larger than 20 μm for substantially reducing the effective refractive index "nm" of microwave. The thickness "tw" of the first thinner portion 2f may preferably be not lower than 1 μm for preserving the roundness of the light beam propagating through the optical waveguide and mechanical strength at the same time.

The thickness "tn" of the second thinner portion 2d may preferably be smaller than the thickness "tw" of the first thinner portion 2f, more preferably be not larger than 12.5 μm and most preferably be not larger than 10 μm, for substantially reducing the effective refractive index "nm" of the microwave.

According to the present invention, the whole of the supporting body may be made of a material having a low dielectric constant. In this case, the low dielectric portion is present direct under the feedthrough portion.

Figure 10:
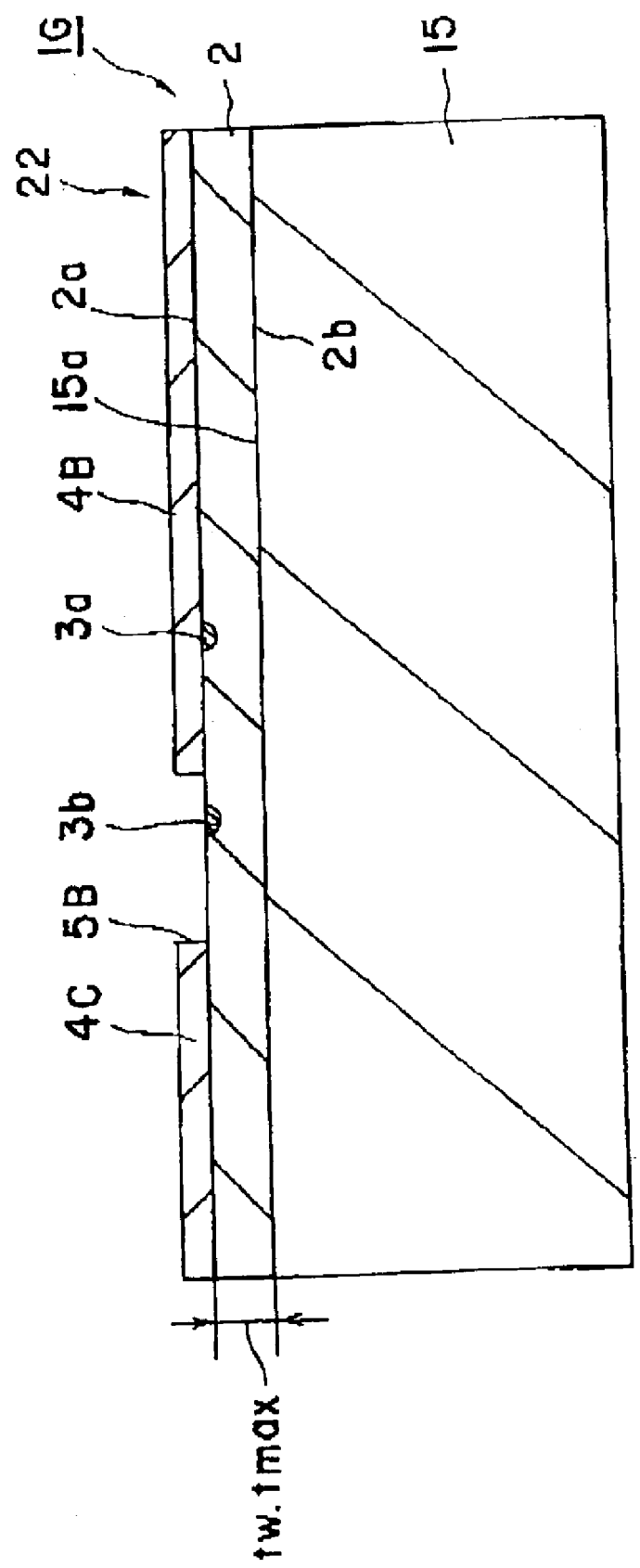
FIG. 10 is a cross sectional view schematically showing a device 1G according to still another embodiment, in which the whole of a supporting body 15 is made of a material having a low dielectric constant.

FIG. 10 is a cross sectional view schematically showing a device 1G according to this embodiment whole of the supporting body 15 of the present example is made of a material having a low dielectric constant. The other main frame 2b of the main body 2 is joined with a main nice 15a of the supporting body 15, by means of a joining agent not shown.

Figure 11:
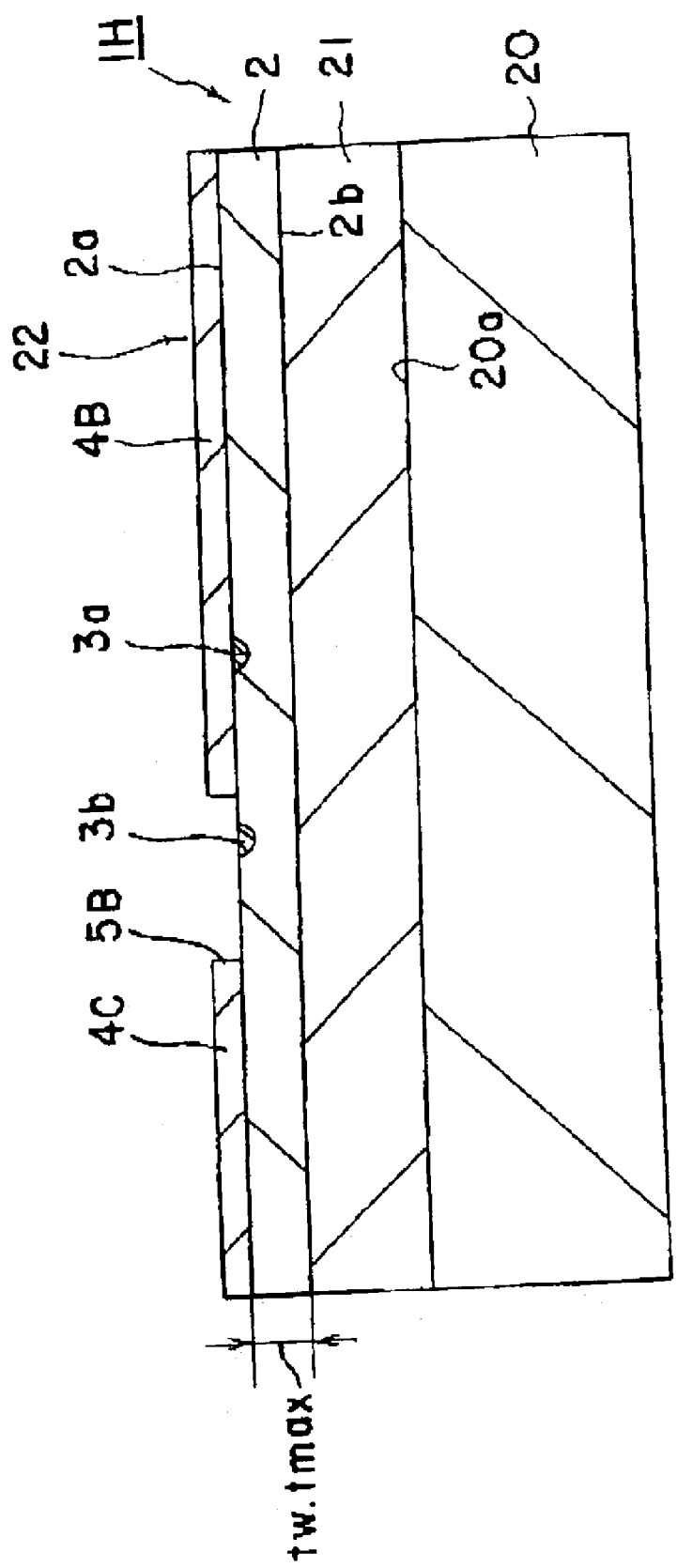
FIG. 11 is a cross sectional view schematically showing a device 1H according to still another embodiment, in which a supporting body 20 and main body 2 are joined with a low dielectric layer 21.

In a device 1H shown in FIG. 11, the main body 2 is joined with the surface 20a of the supporting body 20 through a low dielectric layer 21. The low dielectric layer 21 is joined with the other main face 2b of the main body 2 over substantial whole of the nice 2b, with no space described above formed therein.

Figure 12:
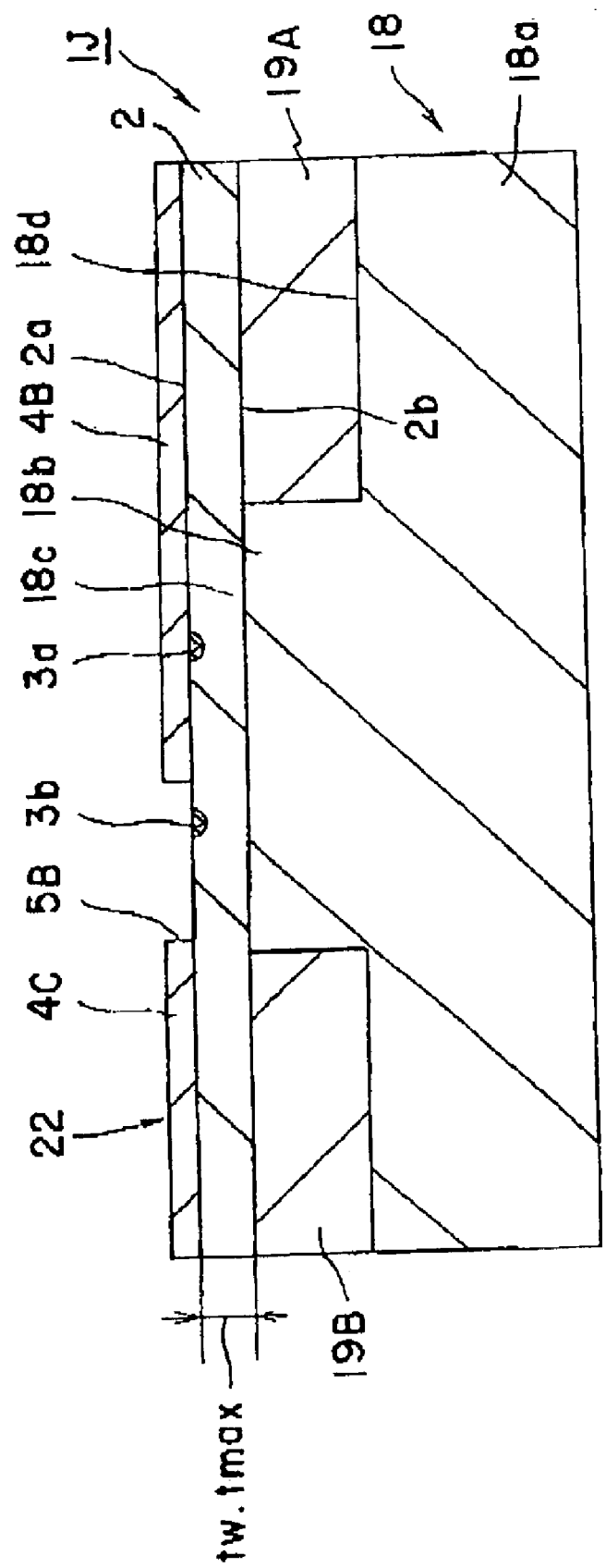
FIG. 12 is a cross sectional view schematically showing a device 1J according to still another embodiment, in which a supporting body 18 and main body 2 are joined in a region of an optical waveguide and a low dielectric layer 19A is provided under a feedthrough portion.

In a device 1J shown in FIG. 12, a supporting body 18 has a plate-shaped portion 18a and protrusions 18b protruding from the plate-shaped portion 18a The other main face 2b of the main body 2 is joined with the surface 18c of the protrusion 18b. Further, low dielectric layers 19A and 19B are provided between the surface 18d of the plate-shaped portion 18a and the other main ice 2b of the main body 2. The low dielectric layers 11A and 19B are made of the material having a low dielectric consent described above. Particularly, the low dielectric layers 19A are present under the feedthrough portions A and B in the side of the other main face 2b of the main body 2, contributing to the improvement of characteristic impedance of the electrode in the feedthrough portions.

In a preferred embodiment the thickness "tw" of the main body is not larger than 50 µm in a region of the optical waveguide. It is thereby made easy to facilitate the velocity matching of the lightwave and microwave. The thickness "tw" may more preferably be not larger than 20 µm on this viewpoint.

The thickness "tw" of the main body in a region of the optical waveguide may preferably be not smaller than 5 µm for preventing the fracture or cracks in the main body.

Further in a preferred embodiment, the maximum thickness "tmax" of the main body is not larger than 500 µm and more preferably be not larger than 100 µm. The reason is as follows. According to the invention, the mechanical strength of the device necessary for proper handling may be mainly given by the supporting substrate, as described above. It is therefore possible to substantially reduce the thickness "tmax" and to preserve the necessary strength of the device at the same time. Further, the thickness "tw" where the optical waveguide is provided may be reduced by reducing the maximum thickness "tmax" of the main body. When the thickness of the main body is constant as a whole, "tmax" is equal to "tw". When a recess is formed in the main body so that "tw" is made smaller than "tmax", as "tmax is larger, the depth of the recess should be larger so as to sufficiently reduce "tw". As the depth of the recess is larger, however, the problems associated with the working process, described above, may be induced. It is effective to apply the main body with a smaller maximum thickness "tmax" (to apply a thinner substrate) before forming the recess, for reducing the problems associated with the working process.

The maximum thickness "tmax" of the main body may preferably be not smaller than 10 µm for preventing the fracture or cracks during the handling of the main body.

EXAMPLES

An optical modulator 1F shown in FIG. 9 was produced. The planar shape was shown in FIG. 1 and the shape and pattern of the feedthrough portions were shown in FIG. 3. An X-cut 3 inch wafer (made of $LiNbO_3$ single crystal) was used as a substrate. An optical waveguide a of Mach-Zehnder type was formed in the surface area of the wafer by titanium diffusion and photolithography. The size of the optical waveguide may be set at, for example, 10 µm at $1/e^2$. The above described CPW electrode pattern was formed by electroplating.

The supporting body 10 made of lithium niobate single crystal was prepared. A sheet having a thickness of 60 µm and made of an epoxy thermosetting resin was set between the main body 2 and supporting body 10, and heated art 80° C. to thermally cure the sheet to form the joining layer 7. The main body 2 and supporting body 10 were thus joined with each other. The resin was prevented from flowing inside of the joining layer 7 during the heating process. The width "Wa" of the space 6 was about 300 µm. The wafer was then removed from a surface plate, and washed with an organic solvent to remove stick wax. The wafer was then cut with a dicing saw working machine to obtain optical chips 1F. Each chip was subjected to optical polishing at the end face of the optical waveguide formed therein A fiber array supporting a 1.5 µm single mode optical fiber was produced. This array was contacted with one end face for input of the optical modulator chip 1F. The optical axes of the fibers were adjusted with those of the optical waveguides, and the arrays and chip were adhered with an ultraviolet light curable resin adhesive. The microwave properties were measured using a vector network analyzer so that the refractive index of microwave "nm" was proved to be as good as 2.15.

Figure 14:
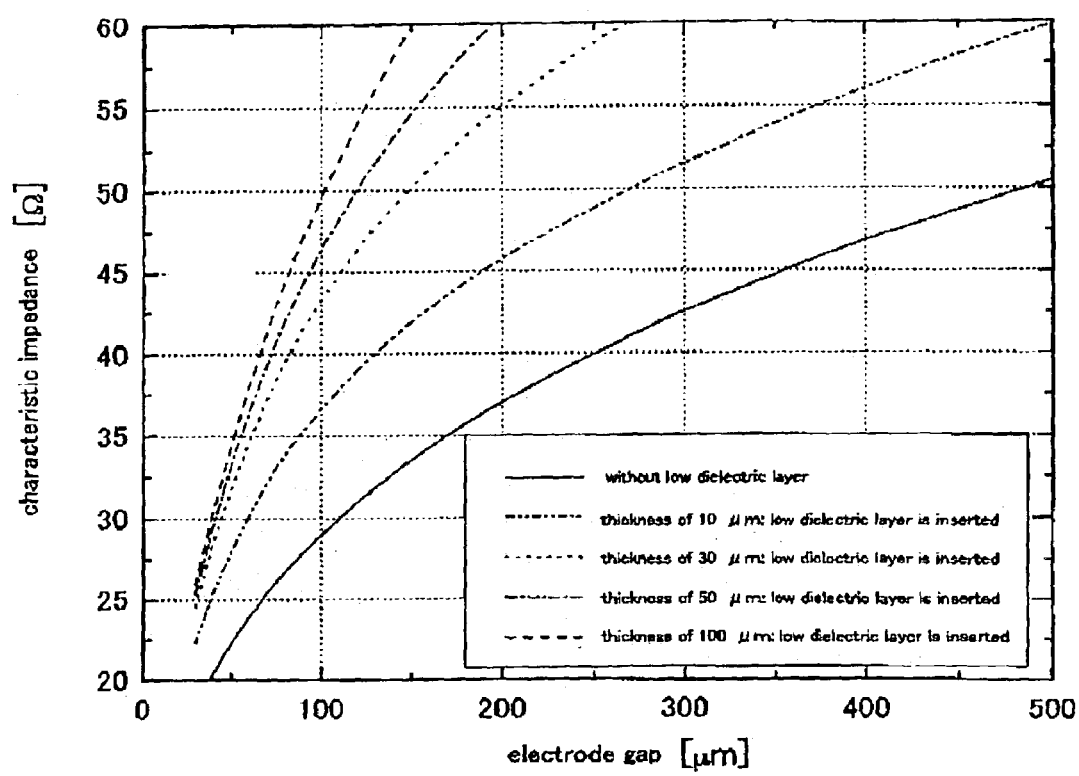
FIG. 14 is a graph showing the relationship between the characteristic impedance of an electrode in a feedthrough portion and the thickness of a low dielectric layer.

The results obtained by numerical calculation using finite element method (FEM) were shown as follows. The numerical calculation was performed for each of the devices shown in FIG. 2, where the low dielectric layer 7 is omitted or the thickness of the layer 7 was variously changed. The results were shown in FIG. 14. The main body was made of lithium niobate single crystal As can be seen from FIG. 14, in the device without the low dielectric layer under the feedthrough portion, it is needed to adjust the electrode gap at about 500 µm in the feedthrough portion for the impedance matching at 50Ω, provided that the thickness of the main body 2A was 15 µm and the width of the center electrode was 100 µm. It is thus predicted that the microwave characteristics of the electrode is deteriorated.

On the other hand, when the low dielectric layer is provided under the feedthrough portion, the characteristic impedance may be adjusted at 50Ω when the electrode gap is 120 µm, provided that the thickness of the low dielectric layer having a dielectric constant of 4.0 is 50 µm. The matching of characteristic impedance may be realized in the feedthrough portion, even when the electrode gap was considerably reduced compared with that in the comparative example.

The numerical calculation was performed for each of the devices shown in FIG. 2, where the low dielectric layer 7 is omitted or the thickness of the layer 7 is variously changed. The results were showing FIG. 14. In the device without the low dielectric layer under the feedthrough portion, it is needed to adjust the electrode gap at about 500 µm in the feedthrough portion for the impedance matching at 50Ω, provided that the thickness of the main body 2A was 15 µm and the width of the center electrode was 100 µm.

Figure 15:
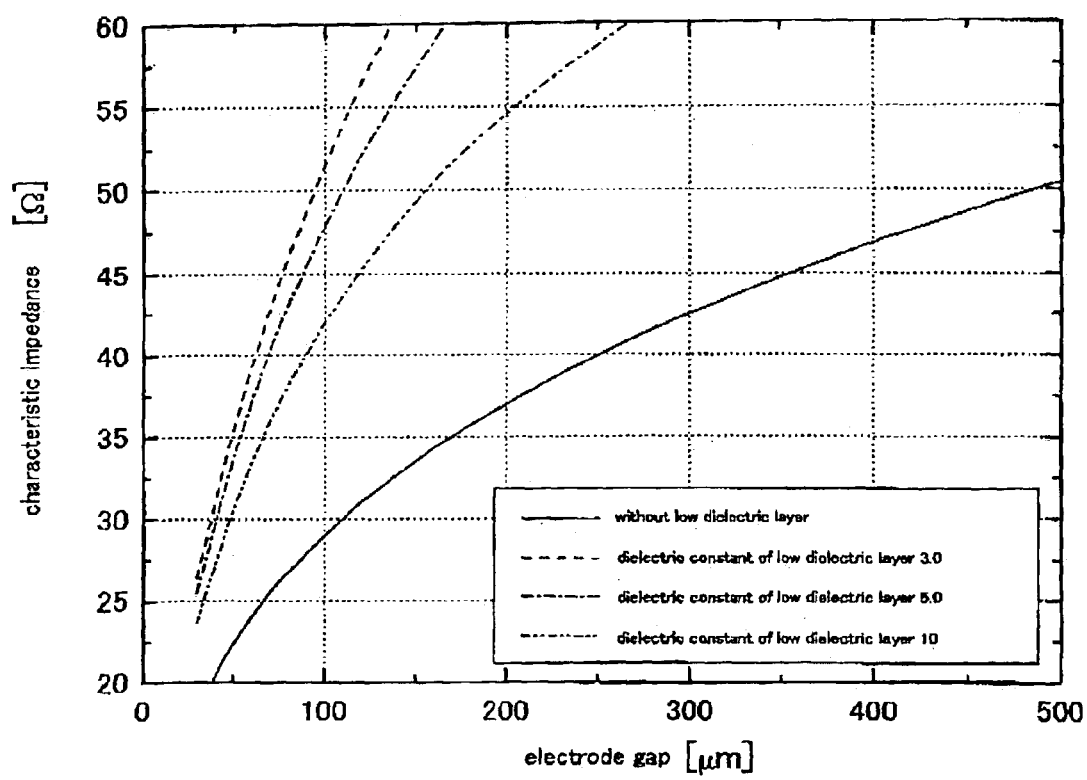
FIG. 15 is a graph showing the relationship between the characteristic impedance of an electrode in a feedthrough portion and the dielectric constant of a low dielectric layer.

On the other hand, when the low dielectric layer having a thickness of 100 µm and reduced dielectric constant was provided under the feedthrough portion, the results shown in FIG. 15 were obtained. It is proved that the electrode gap needed for the impedance matching at 50Ω may be considerably reduced by lowering the dielectric constant of the low dielectric layer.

The characteristic impedance in the feedthrough portion may be thus changed by changing the thickness and dielectric constant of the low dielectric layer. As described above, the characteristic impedance in the feedthrough portion may be adjusted to that in the electrode gap in an outer connector by changing the thickness and dielectric constant of the low dielectric portion. The feedthrough portion having excellent microwave properties may be thus obtained.

The numerical calculation was performed for each of the devices shown in FIG. 2, where the conductive layer 23 was provided on the surface 10a of the supporting body 10. The main body was made of lithium niobate single crystal. When the low dielectric layer is not provided and the conductive layer is directly formed under the main body, the characteristic impedance was proved to be as low as 17Ω, provided that the width of the center electrode was 100 μm, the electrode gap was 120 μm and the thickness of the main body constituting the modulator was 15 μm. In this case, the conductive layer functions as a kind of GND, so that it is impossible to increase the impedance to 50Ω even when the electrode gap is widened On the other hand, when the low dielectric layer 7 (having a thickness of 30 μm and a refractive index of 4.0) was inserted between the conductive layer and main body 2A as shown in FIG. 9, the characteristic impedance in the feedthrough portion was proved to be about 50Ω. It is thus possible to adjust the characteristic impedance and to prevent cavity resonance of the substrate by means of the conductive layer at the same time.

As described above, according to the present invention, impedance matching of the feedthrough portion of the electrode of the device may be realized with that of the outer connector pin. The waveguide (structural) dispersion in the electrode may thus be reduced, and stray inductor and capacitor in the electrode may be also reduced.

The present invention has been explained referring to the preferred embodiments, however, the present invention is not limited to the illustrated embodiments which are given by way of examples only, and may be carried out in various modes without departing from the scope of the invention.

What is claimed is:

1. An optical waveguide device comprising a substrate and a supporting body for supporting said substrate, said substrate having a main body made of an electroopic material having one main face and an other main face, an optical waveguide and an electrode provided on the side of said one main face of said main body;

wherein said supporting body is joined with said main body on the side of the other main face, said electrode comprises a feedthrough portion, and said device further comprises a low dielectric portion provided under said feedthrough portion and between the other main face of said main body and said supporting body; and wherein said main body has a thickness of 100 micrometers or less in a region of said optical waveguide.

2. The device of claim 1, wherein at least a part of said low dielectric portion is composed of a material having a dielectric constant lower than that of said electroopic material.

3. The device of claim 1, wherein a part of the other main face under said optical waveguide faces a space or a solid material of a low dielectric constant.

4. The device of claim 1, wherein said low dielectric portion comprises a joining layer joining said supporting body and the other main face of said main body.

5. The device of claim 4, wherein said joining layer has a thickness of 5 micrometer or larger.

6. The device of claim 1, wherein said low dielectric portion comprises a resin sheet between said supporting body and the other main face of said main body.

7. The device of claim 1, further comprising a conductive layer on the surface of said supporting body at least under said feedthrough portion.

8. A traveling waveguide type optical modulator comprising the device of claim 1, wherein said electrode applies a voltage for a modulating light propagating through said optical waveguide.

9. An optical waveguide device comprising a substrate and a supporting body for supporting said substrate, said substrate having a main body made of an electroopic material having one main face and an other main face, an optical waveguide and an electrode provided on the side of said main face of said main body;

wherein said supporting body is joined with said main body on the side of the other main face, said electride comprises a feedthrough portion, and said device further comprises a low dielectric portion provided under said feedthrough portion and between the other main face of said body and said supporting body; and wherein said low dielectric portion comprises a resin between said supporting body and the other main face of said main body.

10. The device of claim 9, wherein said resin sheet has a thickness of 5 micrometer or more.

11. The device of claim 10, wherein said main body has a thickness of 100 micrometer of more in a region of said optical waveguide.

12. An optical waveguide device comprising a substrate and a supporting body for supporting said substrate, said substrate having a main body made of an electroopic material having one main face and an other main face, an optical waveguide and an electrode provided on the side of said one main face of said main body;

wherein said supporting body joined with said main body on the side of the other main face, said electrode comprises a feedthrough portion, and said device further comprises a low dielectric portion provided under said feedthrough portion and between the other main face of said body and said supporting body;

wherein a recess is formed on the side of the other main face of said main body; and wherein said main body comprises a first thinner portion facing said recess and a second thinner portion facing said recess and having a thickness smaller than that of said first thinner portion, and said optical waveguide is provided in said first thinner portion.

* * * * *